(No Model.)  2 Sheets—Sheet 2.

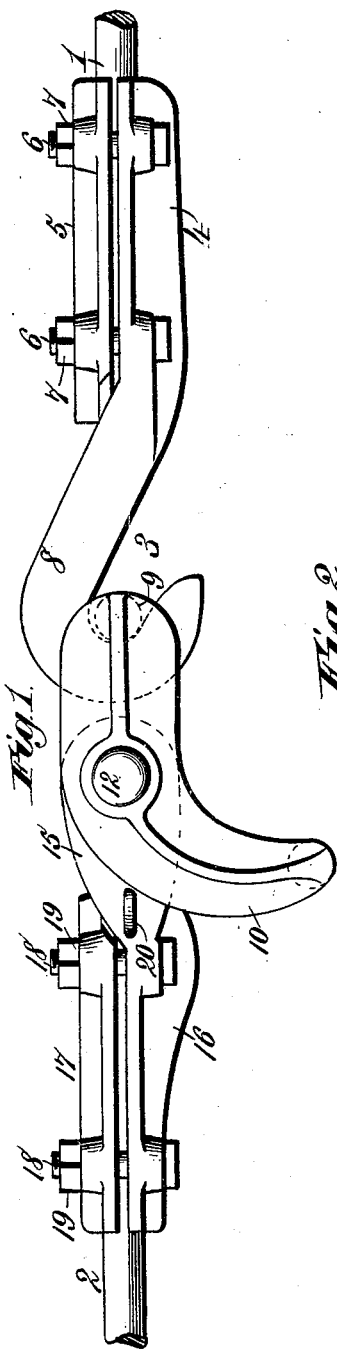
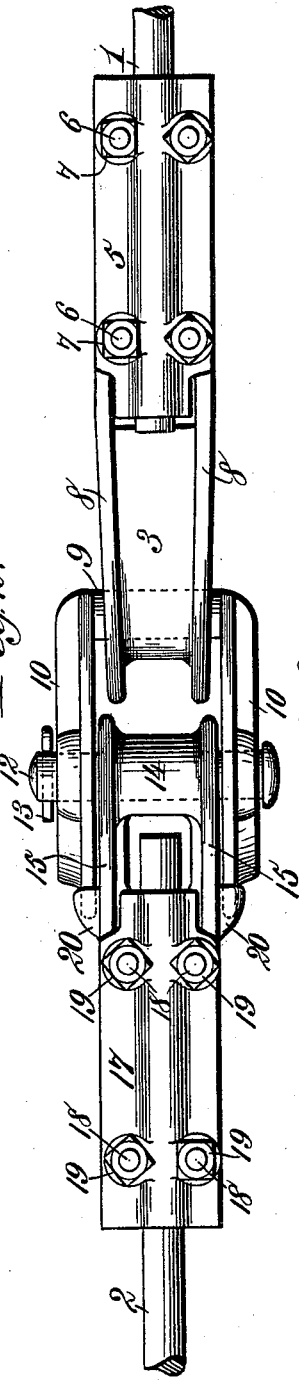
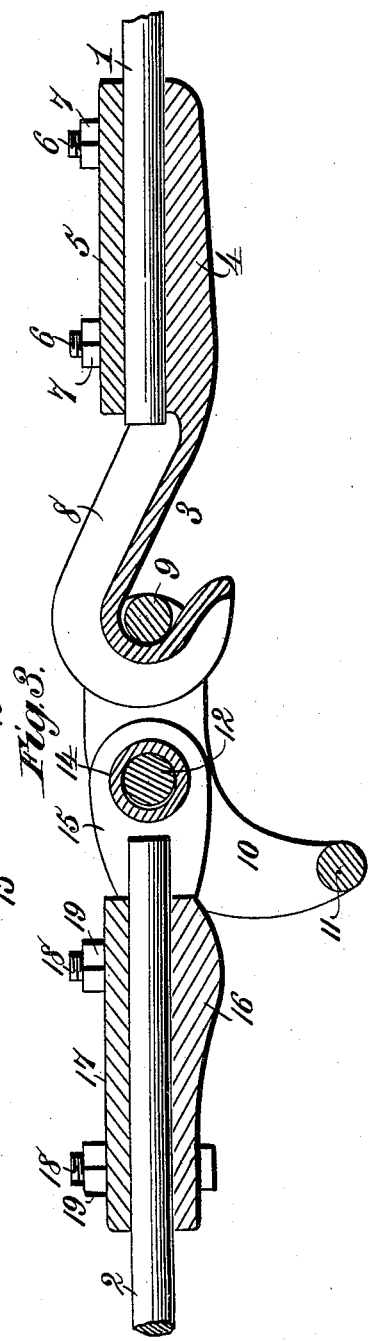

M. S. SCHAILL.
DISCONNECTING COUPLING FOR PULL RODS.

No. 602,037. Patented Apr. 5, 1898.

Witnesses.
Robert Everitt
F. B. Keefer

Inventor.
Michael S. Schaill.
By James L. Norris.
Atty.

UNITED STATES PATENT OFFICE.

MICHAEL S. SCHAILL, OF LIMA, OHIO, ASSIGNOR OF ONE-HALF TO GEORGE H. MEILY AND STEWART M. BRICE, OF SAME PLACE.

DISCONNECTING-COUPLING FOR PULL-RODS.

SPECIFICATION forming part of Letters Patent No. 602,037, dated April 5, 1898.

Application filed June 18, 1897. Serial No. 641,366. (No model.)

*To all whom it may concern:*

Be it known that I, MICHAEL S. SCHAILL, a citizen of the United States, residing at Lima, in the county of Allen and State of Ohio, have invented new and useful Improvements in Pull-Rod Couplings, of which the following is a specification.

This invention relates to connecting and disconnecting couplings for pull-rods of wood, iron, wire, or cable employed for the transmission of power, especially in the pumping of oil-wells, but capable also of useful application for transmitting power from an engine to various kinds of machinery and wherein it is frequently desirable to disconnect the parts intermediate an engine and the machinery operated without stopping the engine or motor.

The object of my invention is to provide a connecting and disconnecting coupling device that can be quickly and easily applied to its intended uses without requiring any change in the construction of ordinary pull-rods of wood, iron, wire, or cable, or of pump-rods of wood, iron, wire, or cable, piston-rods, or pitmen with which the device may be used and which will furnish a reliable connecting-joint for parts of rods of wood, iron, wire, or cable concerned in the transmission of power.

My invention consists in features of construction and novel combinations of parts in connecting and disconnecting coupling devices for pull-rods of wood, iron, wire, or cable, as hereinafter more particularly described and claimed.

In the annexed drawings, Figure 1 is a side view of my improved connecting and disconnecting coupling for cylindrical pull-rods, as of iron, wire, or cable. Fig. 2 is a plan of the same. Fig. 3 is a longitudinal section of the connecting and disconnecting coupling devices with the cylindrical pull-rods in side view. Fig. 4 is a plan view illustrating a modification in the shank portion of the connecting and disconnecting coupling to adapt it for attachment to a rectangular pull-rod, as of wood. Fig. 5 is a cross-section of the same.

Referring to the drawings, the numerals 1 and 2 may designate the sections of a pull-rod of wood, iron, wire, or cable for the transmission of power, or 1 may represent, say, a pump-rod, and 2 the connecting-rod or pitman, of any well-known engine or motor.

One part of the coupling shown in Figs. 1, 2, and 3 consists of a hook 3, having an integral shank portion 4, in one face of which there is preferably a longitudinally extended channel which corresponds with a similar channel in a clamping-plate 5, that may be regarded as a removable portion of the hook-shank. The coinciding channels or grooves in said parts are especially adapted to receive a section 1 of a cylindrical pull-rod of wood, iron, wire, or cable or a pump-rod of wood, iron, wire, or cable, as the case may be, and there are provided bolts 6 and nuts 7, by means of which the said plates 4 and 5 may be securely clamped onto the rod or rod-section of wood, iron, wire, or cable. This coupling-hook 3 is preferably formed with a broad body and with longitudinal ribs or flanges 8, that will impart great strength and rigidity to the device without involving undue weight.

In the operation of coupling the parts of a pull-rod of wood, iron, wire, or cable, or any two like connections, the hook 3 will be engaged with a cross-bar 9 in one end of a yoke 10, that is also provided with a cross-bar 11 in its other end. Intermediate the cross-bars 9 and 11, but nearer the former, there are provided on opposite sides of the yoke 10 suitable holes to permit insertion and withdrawal of a removable pivot, bolt, or headed cross-pin 12, that may be secured by a cotter 13 in one end.

The purpose of the removable pin or bolt 12 is to engage an eye 14 in one end of a clevis 15, that is formed integral with one plate 16 of a clamping device for connecting with the section 2 of a pull-rod of wood, iron, wire, or cable, as shown, there being also comprised in the said clamping device a removable plate 17, together with bolts 18 and nuts 19 for clamping the said plates 15 and 16 onto the rod. The clamping-plates 16 and 17 are preferably provided with coinciding longitudinally-arranged grooves or channels to receive the rod or rod-section of wood, iron, wire, or cable.

The clevis 15 is adapted to operate between the sides of the yoke 10, and on the opposite sides of the clevis are stop-lugs 20 to limit the swinging of the yoke 10, and thereby prevent accidental disengagement of the hook 3 from the shorter end of the yoke. The longer end portion of the yoke 10 is adapted to serve as a lever through which the yoke may be swung in a direction away from the stops 20 to facilitate disengagement of the hook 3 or uncoupling of the rods 1 and 2 when desired.

The pull or surface rods of wood, iron, wire, or cable may be connected from the motor to the pumping-jack at the well, as in pumping oil-wells.

When it is desired to disconnect the pull or surface rods, as 1, from the motor and stop any pump from working, the hook 3 may be disconnected from the yoke 10 by catching onto the cross-bar 11 at the longer arm of the said yoke a hook attached to the end of a section of wooden or iron rod, the opposite end of which is connected by means of a hook and iron screw-eye to a post or other fixed object, as a sill of the power-house, thus tilting the yoke 10, thereby disconnecting the hook 3 and supporting the surface rods firmly in position, so that the well's sucker-rods will be prevented from dropping into the well.

The hook 3 may be hung up in a rope or wire sling attached to a post or other fixed object, thus permitting the hook 3 and the short section of the surface rods, to which it is attached, to swing clear while disconnected.

To connect the coupling, the hook 3 is removed from the sling and caught in the shorter arm of the yoke 10, which starts the surface rods to pumping the well, the connection and disconnection being done while the motor is in motion and without in any way interfering with the pumping connections of any other well or power connections attached to the motor.

In a coupling for connecting the parts or sections of a rectangular rod, bar, or pitman— as of wood, for instance—the shank portions of the hook 3ª and clevis 15ª may be modified, as shown in Figs. 4 and 5. For this purpose the hook 3ª may have formed integral therewith two shank-plates 4ª, between which a rectangular rod, bar, or rod-section 1ª will be received and secured by bolts 6ª and nuts 7ª in any convenient manner. To connect with another rectangular rod, bar, or rod-section, as 2ª, there is provided a clevis 15ª, formed with two side shank-plates 16ª, between which the rod-section 2ª will be secured by bolts 18ª and nuts 19ª, the yoke 10 being formed as before described. The manner of operating the modified form of connecting and disconnecting coupling is the same as already explained.

This coupling is not only applicable to the uniting and disconnecting of pull-rods of wood, iron, wire, or cable, but may be also employed as a coupling for other devices employed in the transmission of power for driving various kinds of machinery as well as pumping apparatus.

What I claim as my invention is—

1. In a coupling for rods, or the like, to be used in the transmission of power, the combination of a hook having a shank portion adapted to be clamped onto a rod or other part to be connected up, a yoke having in one end a cross-bar with which said hook is adapted to engage, a clevis provided with an eye in one end and having a shank portion adapted to be clamped onto another rod or part to be connected up, and a pivot pin or bolt secured through the said clevis-eye and through holes in the sides of the said yoke, substantially as described.

2. In a coupling for rods, or the like, to be used in the transmission of power, the combination with a hook adapted to be clamped to one rod or part, and a clevis adapted to be clamped to another rod or part and having an eye in one end, of a yoke having cross-bars in its ends and provided with holes intermediate its ends, and a pivot pin or bolt adapted to be secured in the holes of said yoke and extended through the eye of the clevis, substantially as described.

3. In a coupling for rods, or the like, to be used in the transmission of power, the combination of a hook having a clamping-shank for connection with a rod of wood, iron, wire or cable or other part, a clevis having a clamping-shank for connection with another rod or part, the said clevis being provided with an eye in one end and having lugs on its opposite sides, a yoke having cross-bars at its ends and provided in its sides with holes intermediate said bars one of said bars being adapted for engagement of the hook, and a pivot, pin or bolt secured in the said holes of the yoke and extended through the eye of the clevis, substantially as described.

In testimony whereof I have hereunto set my hand in presence of two subscribing witnesses.

MICHAEL S. SCHAILL.

Witnesses:
ISSAC N. PAUGH,
WILLIAM M. SCHAILL.